Patented Nov. 7, 1950

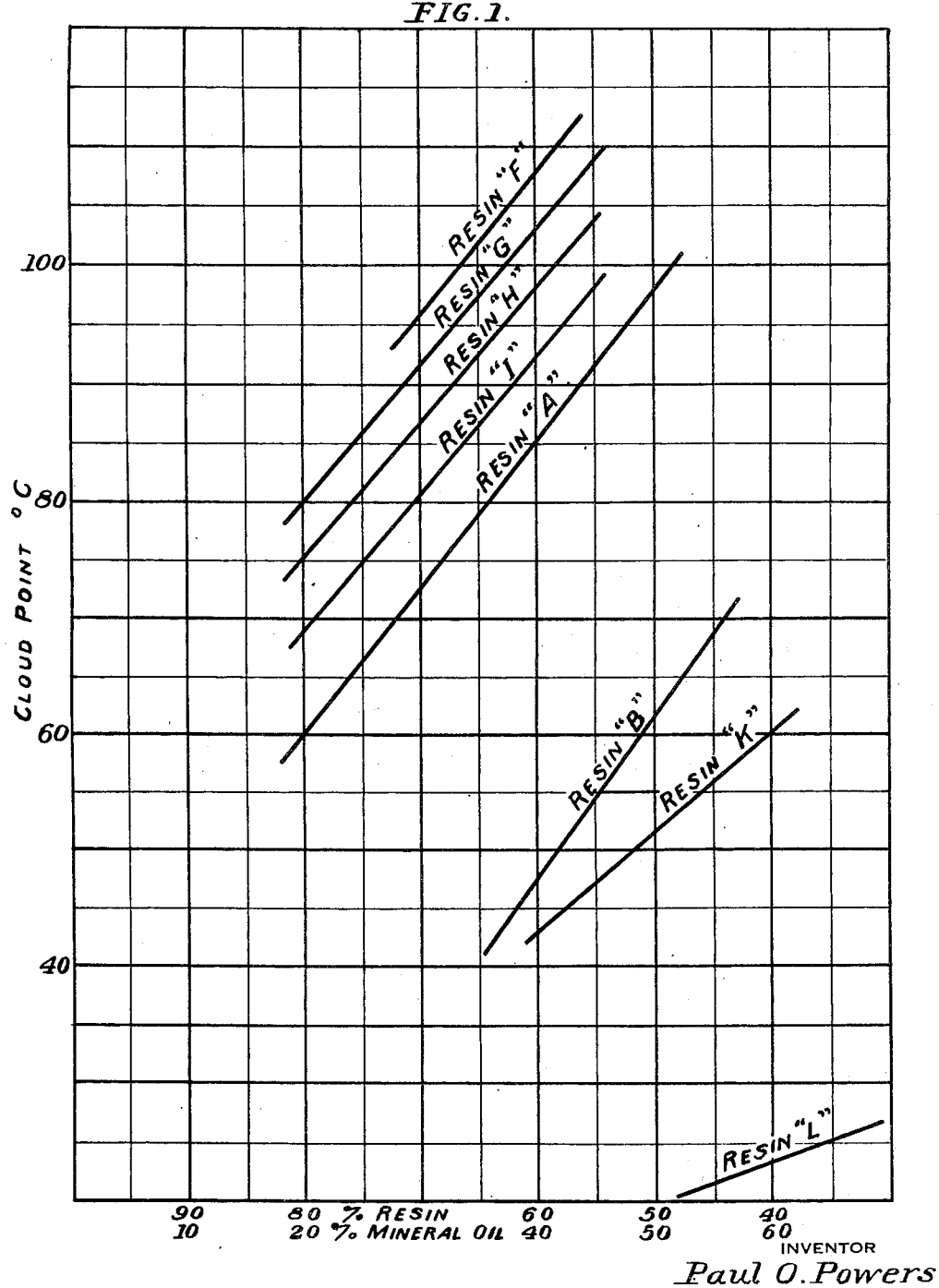

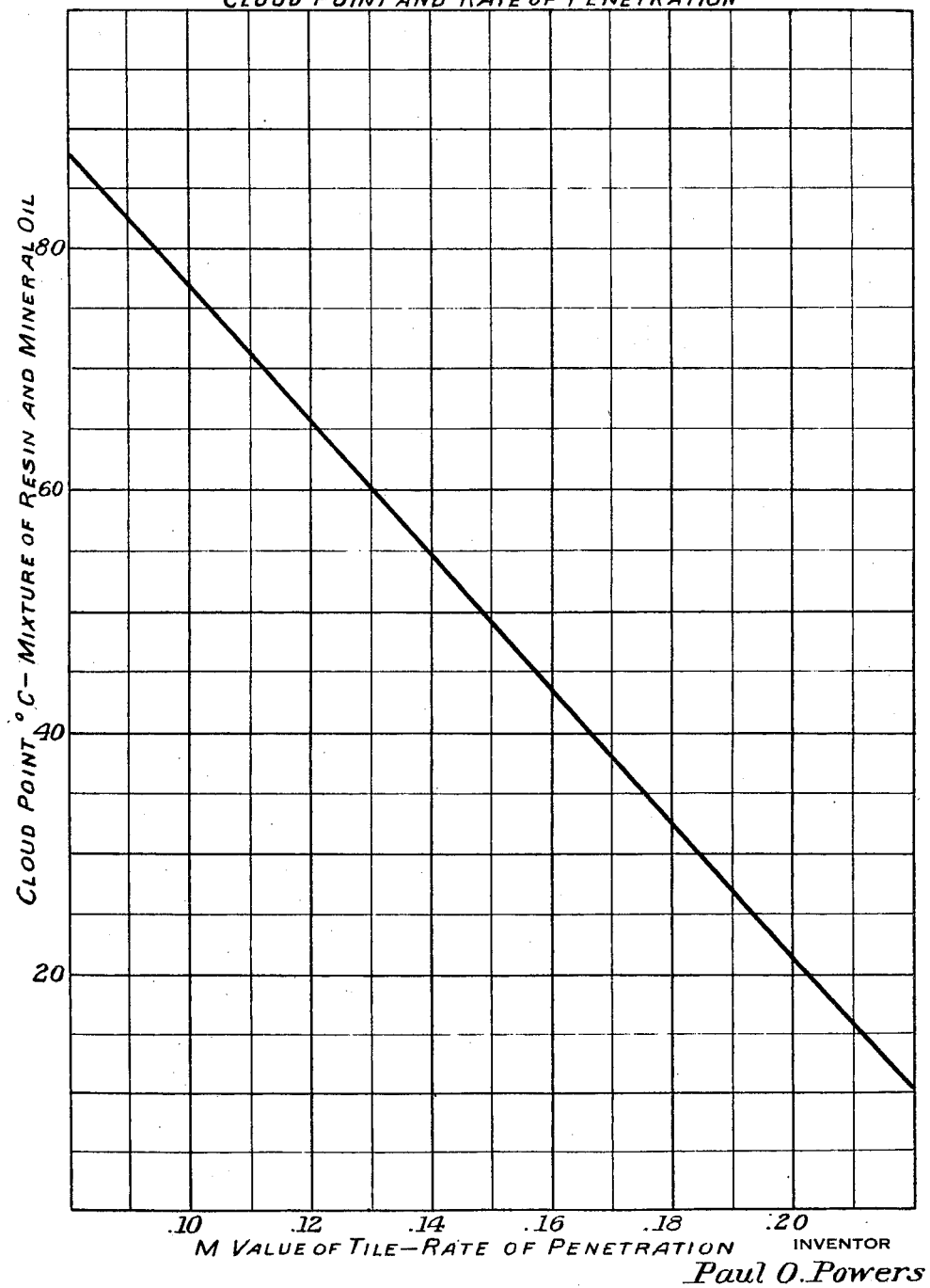

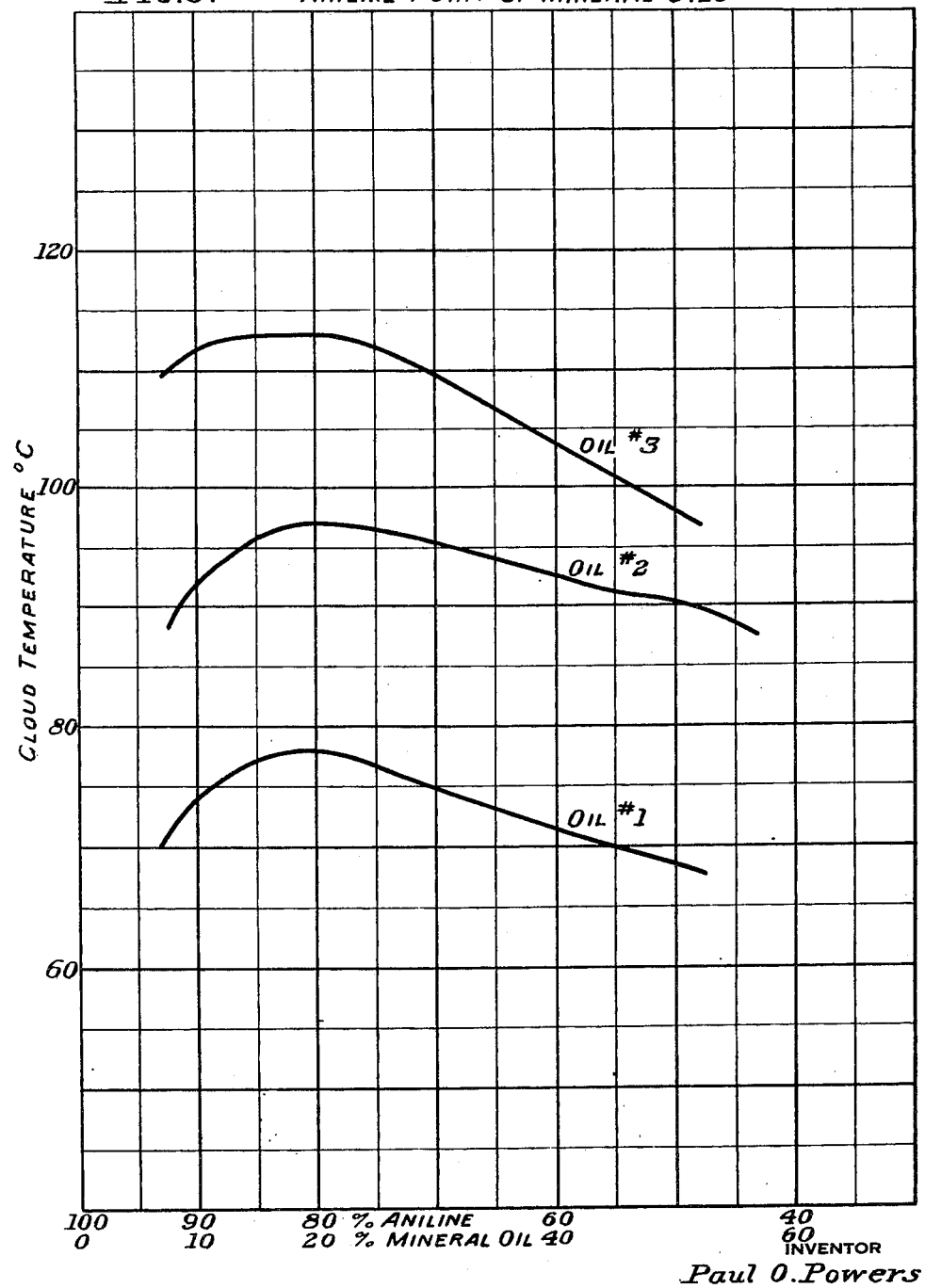

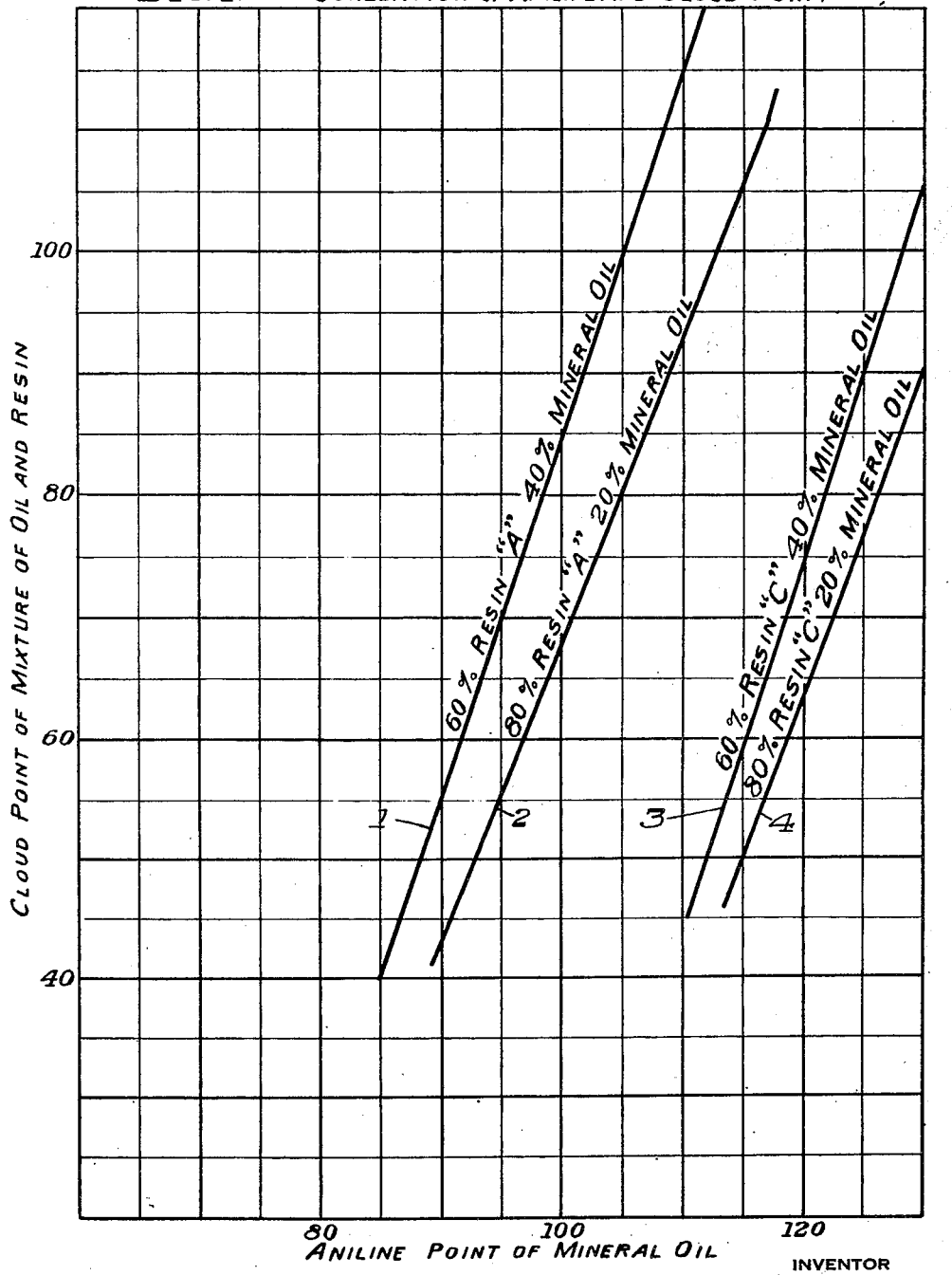

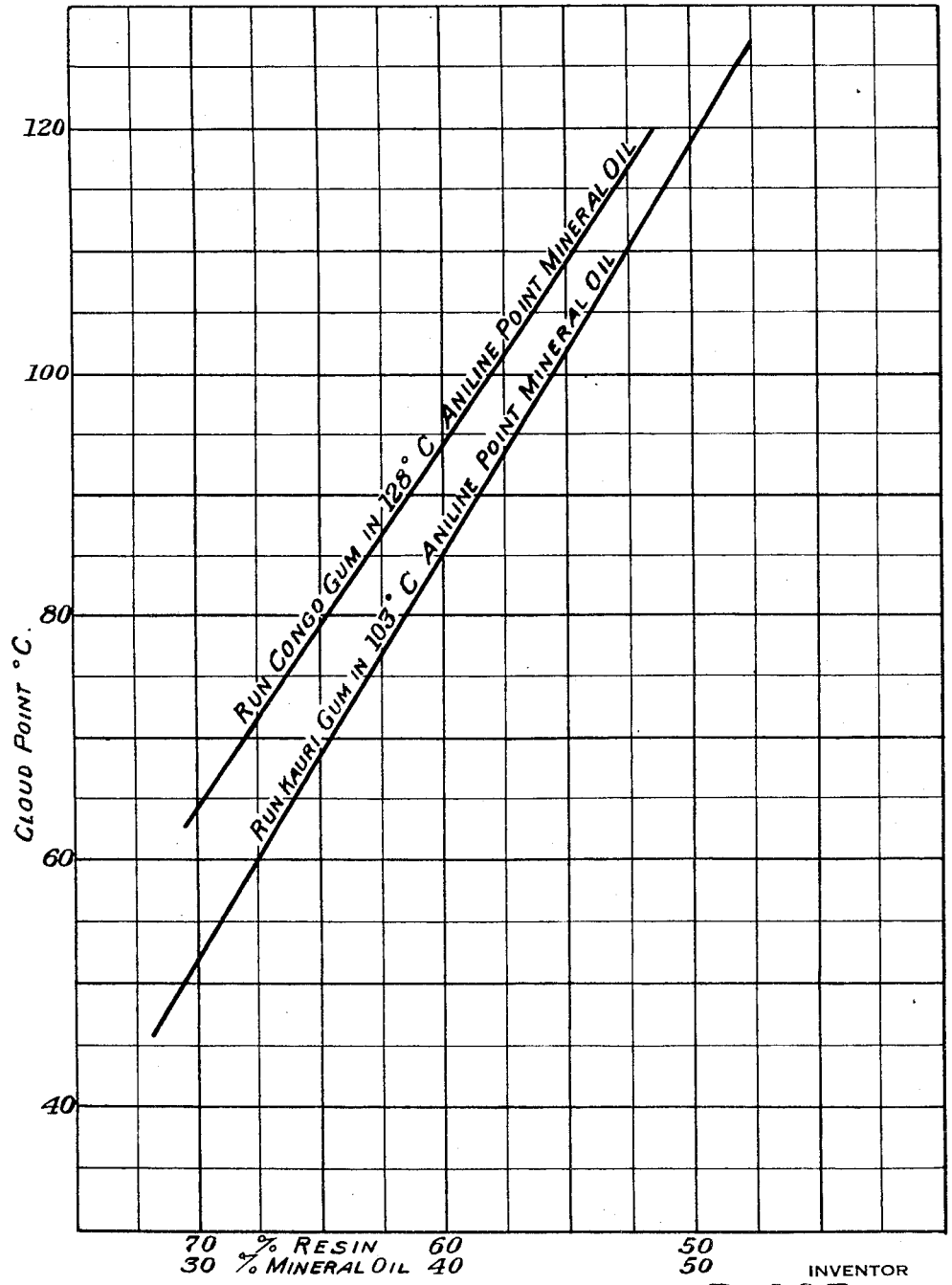

2,529,260

UNITED STATES PATENT OFFICE 2,529,260

TILE AND BINDER FOR THE SAME

Paul O. Powers, Lancaster, Pa., assignor to Armstrong Cork Company, Lancaster, Pa., a corporation of Pennsylvania Application September 17, 1942, Serial No. 458,697

12 Claims. (Cl. 260—33.6)

This invention relates to a method of making tiles and tile binders from resins and plasticizers and to the tile binder and tile. Heretofore it has been common to use as the binder for tiles a resin and an animal or vegetable pitch or an oxidized or heat bodied animal or vegetable drying oil as a plasticizer for the resin. These binders or the tiles made therefrom have been open to numerous objections. In each instance, the plasticizer has been of a saponifiable character and when the finished product is installed on a sub-grade floor, there is saponification of the plasticizer resulting in deterioration of the tile. In the case of the oxidized or heat bodied drying oil plasticizers, the tile becomes gradually hardened upon aging and, as a result, the edges of the tile curl, breaking the bond with the floor and making it impossible to satisfactorily readhere the tile in place.

In order for a tile to be suitable for its intended use, it must exhibit certain characteristics. For example, the tile must have the proper initial indentation and rate of penetration, as will be explained hereinafter more fully. It must not exhibit an undue tendency to sweat or exude plasticizer. It must not be excessively susceptible to deformation at high temperatures or so brittle as to break in manufacture, delivery or installation; and it must not be so soft as to deform unduly in service. Prior to my invention, no method was known except to make up the tile binder or the complete tile and to test it for these properties. I have discovered a method whereby the suitability or unsuitability of any resin and plasticizer mixture for use as a tile binder may be determined without making up the binder or the finished tile. My process involves the utilization of a resin selected on the basis of cloud point to give in proportioned admixture with the desired plasticizer a cloud point within a desired range and forming the binder by mixing the selected resin and desired plasticizer in proportions necessary to impart said cloud point to the binder. This method is applicable irrespective of the resin and plasticizer. The cloud point determination will be fully described hereinafter.

My invention also covers a tile binder and a tile made from the binder and other ingredients such as filler and coloring pigments. The preferred tile binder according to my invention is a resin or a mixture of resins and a mineral oil plasticizer for the resin. Instead of using mineral oil as the only plasticizer, I may use other plasticizers with the mineral oil, in order to impart thereto certain desirable properties, or I may employ other plasticizers without mineral oil.

It has always been considered essential in the manufacture of tiles to form the binder from a resin-plasticizer system in which the binder constituents were mutually soluble in all proportions and at all temperatures above room temperature. It was believed that a resin-plasticizer system in which there was an absence of compatibility between the resin and plasticizer would fail in service because of a separation of the resin and plasticizer and all plasticizers known to be incompatible with the tile resins were scrupulously avoided. This relegated the manufacturer to the use of pitch type plasticizers. Saponification or hydrolysis in such binders was so great, when the tile was laid on concrete floors below grade, that the tile could not be used for such service. The non-saponifiable plasticizers were dismissed because of their lack of compatibility with the available resins. Additionally the tiles had an unusually high rate of penetration which I have discovered was due to the fact that the resin and pitch plasticizer were compatible. Attempts were made to overcome this high rate of penetration by the use of large quantities of fillers but surprising enough loading of the binder with fillers and pigments does not materially alter the rate of penetration or plastic flow of the binder.

I have discovered that a resin-plasticizer system in which there is a limited or controlled incompatibility, of which the cloud point of the mixture I have found to be a true index, will produce a tile binder having the desired physical properties provided certain fundamental limits of incompatibility, determinable by the cloud point of the resin and plasticizer mixture, are observed. The final physical properties of the tile can be thus predicted with absolute certainty.

Preferably, the binder is made by heating the mixture to a temperature at which the resin and plasticizer are compatible and are put in solution so as to produce proper mixing and working characteristics with the filler and pigments. As the binder cools down, there is a precipitation or crystallization of the resin. It has been found that unless this precipitation or crystallization of resin occurs the binder does not have the desired properties. Tiles in which the resin and plasticizer are compatible have a high rate of penetration and excessive deformation at high temperatures, for example 120° F. I need not always heat the resin and plasticizer to such temperature as will make them completely compatible. It is sufficient in some cases if the major proportion of the resin and plasticizer are put in solution.

The present application is a continuation-in-part of my applications, Serial No. 279,123, filed June 14, 1939, and Serial No. 335,986, filed May 18, 1940, both said applications being now abandoned.

In accordance with the embodiment of the invention claimed herein, the tile binder contains 50 to 80% of resin consisting principally of coumarone-indene resin, and 50 to 20% of plasticizer consisting principally of mineral oil which is nonvolatile at ordinary room temperatures. The resin and the plasticizer will have a limited incompatibility with each other such as to produce a cloud-like separation of resin and plasticizer in the binder at a temperature between 20° and 70° C. and consequently the binder will have a cloud point within such temperature range. In the preferred embodiment, the resin and plasticizer will produce a cloud-like separation of resin and plasticizer in the binder at a temperature between 35° and 55° C. The embodiment in which the tile binder comprises a resinous polymer of an unsaturated aromatic hydrocarbon, for example, polystyrene, is the subject matter of my copending application, Serial No. 132,910, filed December 14, 1949.

The invention will be described first for a tile in which the plasticizer of the binder is constituted entirely of mineral oil. Thereafter it will be pointed out wherein the mineral oil may have mixed with it other plasticizers in smaller amount, in order to modify the solvent properties of the plasticizer for the resin. Another embodiment in which a plasticizer other than mineral oil is used will be described also.

The tiles of the present invention contain a filler which may be any inert material but is preferably asbestos or other mineral fillers. In the preferred composition, the filler constitutes about 65 to 75% by weight of the tile; but this proportion may be varied. Pigments may be used in the tile to produce the desired color effects. Pigments such as titanium oxide, carbon black, iron oxide, ochre, or other suitable pigments may be employed.

The invention is particularly concerned with the binder for the tile, the preferred binder being made up of a resin or a mixture of resins and a mineral oil or mixture of mineral oils. In the preferred composition, the resin constitutes about 70% by weight of the binder and the mineral oil about 30%. These proportions may be varied, dependent upon the particular resin and plasticizer used, but for most purposes the mineral oil will be between 20% and 50% by weight of the binder.

In the accompanying drawings, which illustrate certain preferred embodiments of the invention, Fig. 1 is a graph illustrating the cloud points of mixtures of resin and mineral oil containing different proportions of oil and resin. This graph gives the cloud point curves for eight different resins with a given mineral oil;

Fig. 2 is a graph illustrating the relationship between the cloud point of a mixture of resin and mineral oil and the M value of the tile, the M value being proportionate to the rate of penetration of the tile;

Fig. 3 is a graph illustrating the aniline points of three mineral oils, the aniline point being a measure of the mutual solubility of the oil with resins;

Fig. 4 is a graph illustrating the correlation of the aniline point of an oil and the cloud point of a mixture of oil and resin; and Fig. 5 is a graph, similar to Fig. 1, giving the cloud points for two thermally processed or run natural resins in two mineral oils.

This invention will be described particularly as applied to the use of coumarone resins which with mineral oil forms the binder of the tile. Other similar coal tar resins, for example resins formed from indene, styrene and their homologues obtained by the polymerization of coal tar products may be used in place of the coumarone resins. In fact, as will be pointed out hereinafter more in detail, practically any resin or mixture of resins which when mixed with the plasticizer will produce the proper cloud point, may be used.

One of the principal objects of the present invention is to produce tiles in which the initial indentation and the rate of penetration of the tile comes within the required specifications. Another object is to produce such tiles in which the tendency of the tile to sweat or exude plasticizer is minimized. This tendency of the tile to exude plasticizer is objectionable in that the exudate collects dirt and ruins the appearance of the tile.

It has been known for some time that a loaded sphere or paraboloid will sink into a plastic medium over a period of time, according to the McBurney formula:

$$i = At^M$$

where:

$i$ = indentation in mils
$A$ = A-value, a constant which is actually the indentation when $t = 1$ min. (the initial indentation)
$t$ = time in minutes
$M$ = M-value, a constant for that medium I have discovered that when a particular resin and a particular mineral oil have been selected for making the tile binder, the proportions of resin and mineral oil which should be used to give the desired rate of penetration of the tile and to limit the tendency of the tile to exude plasticizer may be determined by determining the cloud points of mixtures of the resin and plasticizer. I have found that the rate of penetration or M value varies with the degree of incompatibility of the resin with the plasticizer. This degree of incompatibility is indicated by the cloud point and accordingly the cloud point is a measure of the rate of penetration of the tile.

If a tile has an M value of greater than .19, the rate of penetration is excessive for some uses. Between .15 and .19 the rate of penetration must be carefully watched and below .15 the rate of penetration is low over a long period of time. It is, therefore, desired to have a low rate of penetration—that is, a low M value, but it has been found that where the resin and plasticizer are used in proportions so as to give a low M value, the tendency of the tile to exude plasticizer is increased.

In order for a tile to have the best physical characteristics, it should have an initial indentation—i. e. an indentation in one minute, between 6 and 25 mils when tested according to the McBurney procedure. Furthermore, it should have a proper rate of penetration. I have found that a tile formed of coumarone-indene resins and resins of a similar nature will have the proper initial indentation, if the resin and plasticizer are mixed in such proportions as to produce a binder having a melting point between about 50 and 70° C. as determined by the ball and ring method.

Referring now to the rate of penetration, since the M value is related to the cloud point, as shown in Fig. 2, all that I have to do in determining what plasticizer I should use with a given resin is to proceed as follows: I make mixtures of the resin and various plasticizers in proportions such that I get a melting point between 50 and 70° C. as determined by the ball and ring method. This gives me a group of resin-plasticizer mixtures which will have the desired initial indentation. I then determine the cloud points of each of these mixtures and select the mixture having the cloud point which gives me the desired M value. This procedure enables me to produce a tile which gives the desired initial indentation, rate of penetration, freedom from excessive deformation at high temperatures and from tendency to exude plasticizer and, as well, a tile devoid of brittleness or excessive softness and with satisfactory working properties for commercial manufacture.

Referring now to Fig. 1, the cloud point curves for 8 different coumarone resins with a mineral oil of 1400 sec. Saybolt Universal viscosity at 100° F. and 97° C. aniline point are given. All of these resins are commercial coumarone-indene resins having melting points between 107° and 135° C. and molecular weights over 500. The cloud point determinations were made by heating amounts of oil and resin until they were in solution and placing the mixture in a test tube in a water bath or glycerine bath. The bath was well stirred and allowed to cool slowly and the temperature at which the mixture became opaque was noted. It will be seen that as the ratio of resin to oil is increased the cloud point decreases. For example, considering the resin designated Resin A, a mixture containing by weight 50% of the resin and 50% of the mineral oil has a cloud point of 98° C., whereas a mixture containing 80% resin and 20% mineral oil has a cloud point of 60° C. The same general relationship holds true for the other resins shown on the chart and the same general relationship exists with other mineral oils. It will be seen from Fig. 1 that the incompatibility of a mixture of any given resin and any given mineral oil may be changed by changing the resin to oil ratio. Thus if a high degree of incompatibility within the operable range is desired, the ratio of resin to oil is decreased and if a lower degree of incompatibility is desired, the ratio is increased.

The cloud point of certain dark colored commercial resins which cannot be measured by direct determination may be established by an indirect method as follows:

Four parts of light colored resin, of known cloud point in a particular mineral oil, are mixed with one part of the dark colored resin and this is blended with the amount of the particular mineral oil. The cloud point of this mixture is determined as described above. From this determination, the cloud point of the dark colored resin is found, following the formula:

$$CP = L + 5(O - L)$$

where:

CP = cloud point of dark colored resin
L = cloud point of light colored resin
O = cloud point of mixture of 4 parts of light colored resin and 1 part of dark colored resin The cloud point determinations show where the incompatibility of resin and oil which I have found is necessary for low rates of penetration begins. The oil and resin mixture having the lowest cloud point that still has a satisfactory rate of penetration is the safest to use. In other words, a mixture having a low cloud point is one in which there is little tendency for the oil to separate from the resin and, therefore, there is little tendency for the tile to exude oil.

These cloud points are of considerable value in using a particular resin and mineral oil. If the cloud point is above 100° C., the oil and resin will not be brought together, that is the oil will not dissolve in the resin under the usual conditions of mixing. If the cloud point is below 20° C., the resin and oil will be highly compatible and the tile made from it will have a high rate of penetration and will be unduly susceptible to deformation at high temperatures. I have found that the optimum cloud point is in the neighborhood of 45° C. and it should for most purposes be between 20° C. and 70° C.

Such limited incompatibility insures a cloud-like separation of resin and oil in the binder. The minute particles which are thrown out of solution to form the cloud are believed to interfere with the internal movement of the binder material, and thus make it more resistant to plastic deformation as evidenced by an M value lower than that of a clear resin-oil mixture. This action is believed to be analogous to the phenomenon known as precipitation hardening in metallurgy in which there is a phase separation of particles which interfere with the movement of the metal crystals along slip planes and therefore make the metal harder and more resistant to plastic deformation.

I have discovered that the solvent properties of a plasticizer for a resin may be determined from its aniline point, as hereinafter described, so that by determining the aniline point of any particular plasticizer its suitability for incorporating the resins may be determined.

Although the viscosity of a mineral oil undoubtedly is a factor in its behavior with resins, I have found that the critical solution temperature in aniline or the aniline point is the best index of the mutual solubility of mineral oil and resin. This test is described in Gardner, "The Physical & Chemical Examination of Paints, Varnishes, Lacquers, Colors, 8th Edition," page 1090. The test is made by heating weighed amounts of mineral oil and aniline until they mix and then slowly cooling. The temperature at which the solution clouds is taken. The maximum temperature at which any of these mixtures of a given mineral oil and aniline clouds is the aniline point. Fig. 3 shows that the highest cloud point usually occurs when 20% oil and 80% aniline are used. Referring to this figure and considering the mineral oil #2, it will be seen that a mixture containing 50% aniline and 50% oil has a cloud point of 90° C., a mixture of 80% aniline and 20% oil a cloud point of 97° C., and a mixture of 90% aniline and 10% oil has a cloud point of 92° C. Thus the aniline point of mineral oil #2 is 97° C.

There is a relationship between the aniline point of a mineral oil and the cloud point of a mixture of a particular resin and the mineral oil. This correlation of aniline point and cloud point is illustrated in Fig. 4. The cloud point of course will vary, as pointed out in connection with Fig. 1, according to the proportion of resin and oil in the mixture. Fig. 4 shows the correlation between the cloud points of four mixtures of resin and oil and the aniline points of various oils. Curve 1 represents a mixture containing 60% of a resin designated Resin A and 40% of mineral oil. Curve 2 represents a mixture of 80% of the Resin A and 20% of mineral oil. Curves 3 and 4 are similar to curves 1 and 2 respectively but represent mixtures of a resin designated Resin C and mineral oil. It will be seen from Fig. 4 that oils having high aniline points produce mixtures of resin and oil having high cloud points. This figure shows that the cloud point for a resin-oil mixture is dependent on the aniline point of the oil. A series of equations has been derived from which the aniline point of the oil to give a desired cloud point with a particular resin can be determined. These equations take the form:

$$C = SA - k$$

where:

$C$ = cloud point
$A$ = aniline point
$S + k$ = Constants

Generally, the values of the constants $S$ and $k$ are peculiar to the nature of the chemical constitution of the plasticizer. For example, for any and all purely hydrocarbon plasticizers, the constants have certain definite values, and for plasticizers which have an ester structure, the constants are certain but of different values generally than those for the hydrocarbons, and so on for other chemical types. Hence, I can substitute one plasticizer for another of the same chemical class having the same aniline point, and little difference in result will be obtained.

I can establish cloud point equations by experimentation to determine the constants $S$ and $k$ for any particular resin at any particular concentration. Then merely by selecting a plasticizer having a known aniline point, I can determine what the cloud point of such a plasticizer will be when it is mixed with the particular resin. From this information I can estimate the cloud points obtainable from mixtures of the resin and plasticizer in various proportions, and since the cloud point is an indication of the degree of incompatibility, which in turn is related (as stated more in detail hereinbelow) to the M value and the tendency to exude plasticizer, I can estimate these values also. The interrelation of these factors enables me to control the properties of the final product by a proper selection of a mineral oil on the basis of its aniline point and of a resin on the basis of its cloud point in conjunction with the plasticizer selected.

Instead of determining the cloud points of resins in the particular mineral oil to be used as the plasticizer, I may use an indirect method. In this indirect method, I determine the cloud points of various resins in a reference mineral oil of known aniline point. From this I can predict with a high degree of accuracy the cloud points of the resins in other plasticizers of known aniline points. I select a suitable resin on the basis of its cloud point determination in the reference mineral oil and then admix the selected resin and desired plasticizer in proportion to give a cloud point between 20° C. and 100° C.

It has been pointed out previously in connection with Fig. 2 that the rate of penetration of the tile or the M value is dependent upon the cloud point of the resin-mineral oil mixture used as a binder. A satisfactory M value is 0.15 and from Fig. 2 it will be seen that this corresponds to a cloud point of about 50° C. This graph represents an average of various cloud point-M value determinations and it will be understood that with different resin and oil mixtures the relationship between cloud point and M value differs somewhat. However, in all of the tests which have been carried out the cloud point to produce an M value of 0.15 is between 45° and 55° C. As shown in Fig. 2, an M value of .18 requires a cloud point of about 32° C., and an M value of 0.12 requires a cloud point of about 65° C.

Since the M value is related to the cloud point as indicated by Fig. 2 and since the cloud point and aniline point are related to each other, as shown in Fig. 4, it follows that the M value or rate of penetration of the tile is dependent upon the aniline point of the oil used with any given resin in any given proportion. Thus, to give a tile with M value of .12 or .15, the aniline point of the oil used with the various resins at various concentrations is as follows:

TABLE I

*Aniline point of mineral oil*

| Resin | For 65° Cloud Point M=.12 | | | For 50° Cloud Point M=.15 | | |
|---|---|---|---|---|---|---|
| | 80% | 70% | 60% | 80% | 70% | 60% |
| 1 | 98 | 95 | 92 | 95 | 92 | 87 |
| 2 | 120 | 112 | 105 | 113 | 105 | 97 |
| 3 | 116 | 116 | 116 | 110 | 108 | 108 |
| 4 | 117 | 117 | 117 | 116 | 113 | 113 |
| 5 | 120 | 120 | 120 | 113 | 113 | 113 |

It will be noted that the aniline point of the oil varies between about 87 and 120° C.

In some cases, it may be more convenient to determine the cloud point of the mixture of the plasticizer with the particular resin directly by experiment instead of deriving this value from the aniline point as described above. Obviously, the cloud point determined by actual measurement serves my purpose just as well as that derived from the aniline point.

The cloud point or temperature at which the mixture of plasticizer and resin clouds on cooling has been found to explain the properties of the binder made from it, particularly the rate of penetration of the tile, its susceptibility to deformation at high temperatures and the tendency to exude plasticizer. I have found that in order to produce tile which have the desired properties, the resin and plasticizer should exhibit limited incompatibility with each other. If the resin clouds in the plasticizer below 20° C. the tile is too soft at high temperatures and the rate of penetration of the tile is excessive. On the other hand, if the resin and plasticizer are extremely incompatible, that is if the cloud point is above 100° C., difficulties are encountered in preparing the binder and furthermore the incompatibility results in excessive exudation of plasticizer, when the tile is used. Where the plasticizer and resin are very incompatible, there is a tendency for the plasticizer to separate from the resin, resulting in an exudate which collects dirt and smudges the tile. I have found, however, that where the resin and plasticizer possess incompatibility within a limited range these objections are overcome, the tile has a sufficiently low rate of penetration and little tendency to exude plasticizer. This incompatibility is such that when the mixture of resin and plasticizer is cooled from a temperature at which the resin and plasticizer are in solution, a cloudy appearance is produced because of the separation of the resin and plasticizer between temperatures of about 20° C. and 100° C. Where a mineral oil is used as the sole plasticizer the cloud point should not exceed about 70° C. and preferably should be from about 35° C. to 55° C. Particularly good results have been obtained at a cloud point of about 45° C. If the cloud point of the mineral oil resin mixtures is above about 70° C. there is an undue tendency for the mineral oil to exude from the tile. However, if a more viscous plasticizer is employed, the cloud point can be as high as about 100° C. without danger of excessive exudation of the plasticizer.

The resin or resin mixture may be combined with a plasticizer or a mixture of plasticizers selected as described above in proper proportions to produce a binder having a cloud point within the preferred range. Such binders have the proper degree of incompatibility to prevent the sweating of plasticizer from tile made therefrom and the tile have M values within the range of practical values mentioned previously.

I have found that the molecular weight of the resin also has an important bearing on the properties of the tile. The bonding strength of the binder is largely dependent upon the molecular weight of the resin. The resins of high molecular weight are the less soluble resins, while resins of lower molecular weight are much more soluble. It must be remembered that the molecular weight is a mean value and it has been found that high polymers are present in certain resins where fractions having a molecular weight of 1300 have been separated. The molecular weights of the materials from which the coumarone-indene resins are made are as follows:

TABLE II

|  | B. P. | Molecular Weight |
|---|---|---|
| Cyclopentadiene | 42.5 | 66.05 |
| Styrene | 146 | 104.06 |
| Indene | 180 | 116.05 |
| Coumarone | 175 | 118.05 |

I have found that the most suitable resins for use in the manufacture of tile have a molecular weight above 500 as determined by the Rast method. It is evident, therefore, that these resins average about the pentamer or five molecules of coumarone, indene or styrene. It is believed that these resins are mixtures containing also a proportion of the tetramer and the hexamer. In the case of one resin, the presence of the decamer and even higher polymers is demonstrated by the high molecular weight of the insoluble fraction. It is the presence of these higher polymers that accounts for the lower solubility of the resins of higher molecular weight.

I have found that the melting point of a resin is not a true index of its suitability for use in a binder but that the molecular weight is a much better index. The molecular weights and melting points of various commercial resins are given in the following table:

TABLE III

| Resin | Molecular Weight (Rast) | Melting Point (Cube in Mercury) |
|---|---|---|
| 6 | 565 | 125-135 |
| 7 | 560 | 107-122 |
| 8 | 685 | 107-122 |
| 9 | 680 | 107-122 |
| 10 | 775 | 125-135 |

It is evident from this table that it is not always true that the molecular weight is proportional to the melting point. For example, the melting points of resin 6 and resin 10 are 125-135° C. and yet the former has a molecular weight of 565 and the latter a molecular weight of 775. The molecular weights of other coumarone resins which have been employed vary between 585 and 810.

Commercial hydrocarbon resins of the same designation made by the same manufacturer vary widely as to their solubility in a given plasticizer, due largely to the variations in the crude materials from which the resins are made. These variations in a given resin are not susceptible of ready detection by tests such as melting point and color. Due to such variations in the resins, binders made by combining them with the same amount of a given plasticizer produced binders that varied widely in character, in rate of penetration, initial indentation, and other physical properties. Accordingly, heretofore there was no way of telling what proportions of a given resin and a given plasticizer should be employed to produce a satisfactory tile binder.

The invention has been described particularly in connection with coumarone, indene and styrene resins and a plasticizer therefor consisting entirely of mineral oil or a mixture of mineral oils. It is understood, however, that the invention is not limited to the use of these types of resins or to mineral oil as the sole plasticizer. It has been found that various agents may be added to the mineral oil to improve its working characteristics. For example, with a mineral oil of relatively low viscosity it may be found desirable to add small amounts of stearine pitch or a gelled drying oil. This improves the working properties of the binders, increases the viscosity and results in a binder which has improved handling properties in the usual manufacturing operations, such as milling and calendering. Polybutene and other highly polymerized olefins may be used for the same purpose. Where stearine pitch or gelled drying oil is used, it should be borne in mind that there is some sacrifice in the resistance of the product to saponification or hydrolysis, and for that reason the amounts added should be relatively small if the product is to be used in those installations where the tile will be subjected to the action of alkalies. It is also pointed out that the addition of such agents has a tendency to alter the cloud point of the resin plasticizer mixture. This should be taken into consideration in proportioning the resin and plasticizer. As a typical example, I may use 70 parts coumarone-indene resin, 30 parts refined mineral oil having an aniline point of 95° C. and 10 parts stearine pitch. The resulting product will have a cloud point somewhat higher than if the stearine pitch were not used. The working properties as above specified will be improved. The combination of stearine pitch and mineral oil should be such that when combined with the particular resin chosen it will have a cloud point within the required range.

With certain of the higher molecular weight resins, it has been found that there are no light colored mineral oils available which have sufficient solvent properties to produce a cloud point in the required range. In such cases, plasticizers other than mineral oil are used, possessing the necessary solvent power to obtain the required cloud point. If the resin is such that a combination of mineral oil and other plasticizers may be incorporated, it is desirable in those instances where the tile will be subjected to attack by alkalies to use as much mineral oil as possible because of its resistance to saponification and hydrolysis and because of its low cost and ready availability. In some instances, however, a plasticizer containing substantially no mineral oil must be used. The preferred plasticizers are, as mentioned above, mineral oils which are predominantly aromatic, hydroaromatic or naphthenic in character. Other plasticizers which may be used either alone or in combination with the mineral oil and which have high solvent power, are diphenyl, chlorinated diphenyl, chlorinated polyphenyls, distyrene, di-indene, dicumarone, methyl abietate and analogous abietic acid esters as well as hydrogenated abietic acid esters, phthalic acid esters, such as methyl phthalyl ethyl glycollate, butyl phthalyl butyl glycollate, diethylene glycol phthalate, phosphoric acid esters of phenols, such as cresyl phosphate and phenyl phosphate, and diphenyl phosphates (xenyl phosphates).

Many of these plasticizers are substantially non-saponifiable and produce tiles that are substantially non-saponifiable under tile service conditions which include tile laid on concrete floors below grade. Thus, although mineral oil is the preferred non-saponifiable plasticizer, I may substitute it either in whole or in part in the production of a tile binder by one or more of the following plasticizers which are non-saponifiable under tile service conditions:

Diphenyl
Chlorinated Diphenyl
Chlorinated Polyphenyls
Distyrene
Di-indene
Di-coumarone
Methyl Abietate and Analogous Abietic Acid Esters and Hydrogenated Abietic Acid Esters The coumarone-indene resins are the preferred resins for use according to the present invention, because of their price and availability. Mineral oils are on the market which will produce a cloud point with these resins within the desired range.

Polystyrene resins having a molecular weight between 500 and 100,000 may be employed and resins of this class having a molecular weight above 1000 by the depression of freezing point or Staudinger method are preferred. As the molecular weight of these resins increases, plasticizers with better solvent power than mineral oil alone should be used to bring the cloud point in the desired range. Commercial resins of this class are sold under the trade names of "Styron" and "Lustron." Where the molecular weight of these resins is over 1000, tiles made therefrom are resistant to oils and greases and are particularly suitable for kitchens, restaurants, and machine shops.

Examples of suitable resins are the polymers of unsaturated hydrocarbons, such as cracked petroleum oils, olefines, a mixture of olefines and diolefines, indene, styrene, homologues of styrene, mixtures of coumarone, indene, styrene and their homologues, dihydronaphthalenes, particularly the 1,2-dihydronaphthalene, and condensation products of formaldehyde with cracked petroleum oils, with olefines, or with aromatic hydrocarbons, such as xylenes and naphthalene.

Individual polymers or condensation products may be used as the resin binder for the tile or a mixture of polymers, condensation products, or both may be used.

Phenolic resins such as the fusible resins having molecular weight between 500 and 2,000 may be plasticized with mineral oil alone. Commercial resins of this type are sold under the trade names "Durez" and "Resinox."

Polyvinyl chloride resin such as the resin sold under the trade name "Vinylite Q" and polyvinyl chloride-acetate copolymers such as the resin sold under the trade name "Vinylite V," are oil and grease resistant and produce an excellent tile product. A preferred plasticizer for these resins is a mixture of mineral oil and tricresyl phosphate.

Resins of the rosin-maleic anhydride-glyceride type, such as those sold under the trade names "Amberol Maleics" and "Beckacite Maleics" can be used with suitable mineral oils, provided they give the desired cloud point, between 20° and 70° C.

Rosin modified phenolic resins such as those sold under the trade names "Amberol" and "Beckacite," particularly the less soluble resins of this class, may be used with mineral oils to produce satisfactory tile binders.

Examples of other resins together with their trade names which may be used according to the present invention are as follows:

| | Resins | Trade Names |
|---|---|---|
| 1 | Polyester resins | Glyptal<br>Rezyl<br>Duraplex<br>Petrex<br>Paraplex |
| 2 | Polyvinyl acetate | Gelva<br>Vinylite A |
| | These resins are preferably used with hard resins such as coumarone-indene. The preferred plasticizer is a mixture of mineral oil and dibutyl phthalate or other phthalate esters. | |
| 3 | Acetals of polyvinyl alcohols | Butvar<br>Butacite<br>Vinylite X |
| 4 | Polyvinylidene chloride | Saran |
| 5 | Acrylate and Methacrylate | Plexiglas<br>Lucite<br>Acryloid |
| | The butyl and higher ester polymers of these resins can be used with some mineral oils alone. It is desirable to use a mixture of mineral oil and an ester type plasticizer, such as butyl phthalate, with the methyl ester polymers. | |
| 6 | Rubber chloride | Parlon |
| 7 | Rubber hydrochloride | Pliofilm |
| 8 | Isomerized rubber | Vulcalock<br>Plioform |
| | Resins 6, 7 and 8 are preferably used with a plasticizer consisting of mineral oil and a plasticizer having a higher solvent power than the mineral oil. | |

Among other plasticizers which may be substituted in whole or in part for the mineral oil to impart the proper cloud point to the resin-plasticizer mixture are the following:

1. The polyester resins of the type sold under the trade names "Glyptal," "Rezyl," "Duraplex," "Petrex" and "Paraplex" previously referred to.
2. Polyethylene glycol.
3. Polysulphide rubbers, for example "Thiokol A."
4. Polybutenes such as "Vistanex."
5. "Neoprene" may be used as a plasticizer with hard resins (coumarone-indene).
6. The synthetic rubbers sold under the trade names "Buna S," "Hycar" or "Chemigum" and "Butyl Rubber" are useful plasticizers with liquid plasticizers such as mineral oil. A relatively small proportion of the synthetic rubber improves the flexibility of the tile binder.

The methods of preparation, chemical structure and trade-names of different varieties of the more important commercial synthetic resins and rubbers, including "Durez," "Resinox," "Amberol," "Beckacite," "Glyptal," "Rezyl," "Duraplex," "Petrex," "Paraplex," "Buna S," "Hycar," "Chemigum," and "Butyl Rubber," are given in News Edition, American Chemical Society, vol. 19, page 750, July 10, 1941, and Chemical and Engineering News, American Chemical Society, vol. 20, page 536, April 25, 1942. These resins are further identified as follows:

"Durez" and "Resinox" are phenol-formaldehyde resins.

"Amberol" or "Beckacite" are maleic anhydride resins modified with rosin or phenol-formaldehyde resins modified with rosin.

"Glyptal," "Rezyl" and "Duraplex" are phthalic anhydride-fatty acid glyceride resins.

"Petrex" is a terpene-maleic anhydride-fatty acid glyceride resin.

"Paraplex" is a sebacic acid glyceride resin.

"Buna S" is a butadiene-styrene copolymer resin.

"Hycar" and "Chemigum" are butadiene-acrylonitrile copolymer resins.

"Butyl Rubber" is a butadiene-diolefin copolymer.

Natural resins such as the true fossil resins or the semi-fossil or recent fossil resins may be employed also, although it is necessary to thermally process or "run" these natural resins. As examples of the true fossil resins, I may use Congo, Kauri, Sandarac and Pontianak. Examples of the semi-fossil or recent fossil resins which may be used are East India gum in its various forms and Batu. These natural resins per se are insoluble in mineral oil and it is necessary to thermally process or run them, in order to make them suitable for use in tile binders. The true fossil resins may be thermally processed by heating them to 300–350° C., for example, and the recent fossil resins by heating them to 150–200° C.

Combinations of natural and synthetic resins may be employed, such for example as a mixture of 35 parts of run East India gum and 35 parts of coumarone with 30 parts of mineral oil No. 2. Where mixtures of resins are used, the cloud point determinations should be made on the mixed resins, because of their mutual solubility. In some cases, this may materially alter the cloud point.

In Fig. 5, the cloud points of mixtures of run Congo gum and mineral oil, and run Kauri gum and mineral oil are given. It will be seen that the characteristics of these resins in mineral oils is quite similar to those of the coumarone resins shown in Fig. 1.

The following are typical examples of tiles made in accordance with my invention, it being understood that these examples are given merely for the purposes of illustration:

EXAMPLE I 70 parts by weight of coumarone-indene resin of a molecular weight of approximately 600,
30 parts by weight of mineral oil of 1400 seconds Saybolt Universal viscosity at 100° F. and 97° C. aniline point,
250 parts by weight of fillers and pigments.

The resin is of a character such that the resin-mineral oil mixture has a cloud point of 45° C. The mixture of resin and oil is blended in a steam heated mixing kettle, and after a period of time sufficient to effect a proper blending, the filler and pigments are added and the batch mixed to obtain a uniform distribution of the binder on the filler and pigment. The mass is then milled to obtain a still better distribution and form a sheet which is subsequently calendered to produce the required surface finish and is then severed into tiles.

EXAMPLE II 60 parts of polystyrene having a molecular weight of about 25,000 by the Staudinger method,
25 parts of a naphthenic mineral oil having an aniline point of 70° C., and
15 parts of hydrogenated methyl abietate sold under the trade-name "Hercolyn."

Such mixture has a cloud point of about 52° C. It is blended in a steam heated mixing kettle and the procedural steps recited in Example I are followed in making the tile.

EXAMPLE III 60 parts of a polystyrene resin having a molecular weight of approximately 1000 by the Rast method,
20 parts of diethylene glycol phthalate, and
20 parts of hydrogenated methyl abietate.

Such a mixture has a cloud point of about 40° C. and is blended in a steam heated kettle and like Example I is incorporated with pigments and fillers, milled, calendered and formed into tiles.

The products of Examples II and III are particularly resistant to oils and greases.

As can be seen from the wide variety of types of resins which have been referred to, the present invention is not restricted to the use of any particular type of resin. Any resin can be used to make the tile binder which gives the required cloud point when mixed with the plasticizer, provided of course that the resin is not too flammable or has some other property which is subversive to the properties required in a tile binder.

The invention is not limited to the specific examples or preferred proportions, which have been given merely for illustrative purposes, but may be otherwise embodied or practiced within the scope of the following claims.

I claim:

1. A tile composed of a filler and a binder therefor having a melting point between 50° and 70° C. as determined by the ball and ring method and containing 50 to 80% of coumarone-indene resin having a melting point of 107° to 135° C. and a molecular weight above 500 as determined by the Rast method and 50 to 20% of plasticizer consisting principally of mineral oil which is non-volatile at ordinary room temperatures and has an aniline point of 87° to 120° C., said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

2. A tile composed of a filler and a binder therefor having a melting point between 50° and 70° C. as determined by the ball and ring method and containing 50 to 80% of coumarone-indene resin having a melting point of 107° to 135° C. and a molecular weight above 500 as determined by the Rast method and 50 to 20% of mineral oil plasticizer which is non-volatile at ordinary room temperatures and has an aniline point of 87° to 120° C., said resin and plasticizer having a limited incompatibility with each other such as to produce a cloud-like separation of resin and plasticizer in the binder at a temperature between 35° and 55° C., said binder having a cloud-like separation of resin and plasticizer resulting from the limited incompatibility of resin and plasticizer characterized by a cloud point between 35° and 55° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

3. A tile composed of a filler and a binder therefor containing 50 to 80% of resin consisting principally of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

4. tile binder having a melting point between 50° and 70° C. as determined by the ball and ring method and containing 50 to 80% of coumarone-indene resin having a melting point of 107° to 135° C. and a molecular weight above 500 as determined by the Rast method and 50 to 20% of plasticizer consisting principally of mineral oil which is non-volatile at ordinary room temperatures and has an aniline point of 87° to 120° C., said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling.

5. A tile binder having a melting point between 50° and 70° C. as determined by the ball and ring method and containing 50 to 80% of coumarone-indene resin having a melting point of 107° to 135° C. and a molecular weight above 500 as determined by the Rast method and 50 to 20% of mineral oil plasticizer which is non-volatile at ordinary room temperatures and has an aniline point of 87° to 120° C., said resin and plasticizer having a limited incompatibility with each other such as to produce a cloud-like separation of resin and plasticizer in the binder at a temperature between 35° and 55° C., said binder having a cloud-like separation of resin and plasticizer resulting from the limited incompatibility of resin and plasticizer characterized by a cloud point between 35° and 55° C. when the cloud point is determined by heating the binder until the resin and plasticizer are in solution and noting the temperature at which the binder becomes opaque on cooling.

6. A tile binder containing 50 to 80% of resin consisting principally of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling.

7. A tile binder containing 50 to 80% of resin consisting principally of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 35° and 55° C., said binder having a cloud-like separation of resin and plasticizer resulting from the limited incompatibility of resin and plasticizer characterized by a cloud point between 35° and 55° C. when the cloud point is determined by heating the binder until the resin and plasticizer are in solution and noting the temperature at which the binder becomes opaque on cooling.

8. A tile composed of a filler and a binder therefor containing 50 to 80% of resin consisting principally of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 35° and 55° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

9. A tile binder containing 50 to 80% of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling.

10. A tile composed of a filler and a binder therefor containing 50 to 80% of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 20° and 70° C., said binder having a cloud-like separation of resin and plasticizer resulting from the limited incompatibility of resin and plasticizer characterized by a cloud point between 20° and 70° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

11. A tile binder containing 50 to 80% of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 35° and 55° C., said binder having a cloud-like separation of resin and plasticizer resulting from the limited incompatibility of resin and plasticizer characterized by a cloud point between 35° and 55° C. when the cloud point is determined by heating the binder until the resin and plasticizer are in solution and noting the temperature at which the binder becomes opaque on cooling.

12. A tile composed of a filler and a binder therefor containing 50 to 80% of coumarone-indene resin and 50 to 20% of plasticizer consisting principally of mineral oil which is non-volatile at ordinary room temperatures, said resin and plasticizer having a limited incompatibility with each other such as to produce a cloud-like separation of resin and plasticizer in the binder at a temperature between 35° and 55° C., said binder having a cloud-like separation of resin and plasticizer resulting from the limited incompatibility of resin and plasticizer characterized by a cloud point between 35° and 55° C. when the cloud point is determined by heating the binder until the resin and plasticizer are in solution and noting the temperature at which the binder becomes opaque on cooling, said tile having an initial indentation of 6 to 25 mils when determined according to the McBurney procedure.

PAUL O. POWERS.

REFERENCES CITED

The following references are of record in the file of this patent:

UNITED STATES PATENTS

| Number | Name | Date |
|---|---|---|
| 1,246,827 | Ellis | Nov. 13, 1927 |
| 1,929,453 | Semon | Oct. 10, 1933 |
| 2,011,607 | Reeve | Aug. 20, 1935 |
| 2,099,241 | Stewart | Nov. 16, 1937 |
| 2,145,648 | Fawkes et al. | Jan. 31, 1939 |
| 2,162,178 | Marasco | June 13, 1939 |
| 2,204,772 | Rivkin et al. | June 18, 1940 |
| 2,217,988 | Lawson | Oct. 15, 1940 |
| 2,222,490 | Robertson | Nov. 19, 1940 |
| 2,241,538 | Buckeridge | May 13, 1941 |

FOREIGN PATENTS

| Number | Country | Date |
|---|---|---|
| 614,029 | Germany | May 9, 1935 |

OTHER REFERENCES

Mattiello, Protective and Decorative Coatings, vol. I, 1941, pages 202, 203, 580 and 596.

Federal Specification for Tile: Asphalt SS-T-306, May 1, 1934, pp. 1 and 2.

Barrett Co., Cumar, (1936), pages 18, 19, 21, 34 and 35.

Vlugter, Institution of Petroleum Technologists, vol. 21, 1935, pages 661 and 671.

Abraham, Asphalts and Allied Substances, 1938, 4th ed., pages 555, 556, 1008, 1009 and 1312.

Morrell, Synthetic Resins and Allied Plastics, 1943 (2nd ed.), pages 7 to 9.

Ellis, Chemistry of Synthetic Resins, 1935, vol. I, page 13.

Gardner, Physical and Chemical Examination of Paints, Varnishes, Lacquers and Colors, 9th Ed., 1939, pages 417 to 419.

Cross, Handbook of Petroleum Asphalt and Natural Gas, 1928, pages 9 and 435.

Ellis, Industrial and Engineering Chemistry, vol. 30, No. 1, pages 20 to 23, January 1938.

Chatfield, Varnish Constituents, 1944 (Interscience, N. Y.), pages 406, 420, and 425.